United States Patent
Kim et al.

(10) Patent No.: US 10,025,140 B2
(45) Date of Patent: Jul. 17, 2018

(54) LIQUID CRYSTAL DISPLAY

(71) Applicant: Samsung Display Co., Ltd., Yongin-si (KR)

(72) Inventors: Ji-Hoon Kim, Hwaseong-si (KR); Sang-Gu Lee, Hwaseong-si (KR); Seung Hee Lee, Hwaseong-si (KR); Hyo Sung Hong, Suwon-si (KR); Dae Won Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 311 days.

(21) Appl. No.: 14/867,876

(22) Filed: Sep. 28, 2015

(65) Prior Publication Data

US 2016/0299371 A1    Oct. 13, 2016

(30) Foreign Application Priority Data

Apr. 8, 2015  (KR) .................. 10-2015-0049658

(51) Int. Cl.
*G02F 1/13363* (2006.01)
*G02F 1/1362* (2006.01)
*G02F 1/1335* (2006.01)

(52) U.S. Cl.
CPC .... *G02F 1/13363* (2013.01); *G02F 1/133528* (2013.01); *G02F 1/136209* (2013.01); *G02F 2001/136222* (2013.01); *G02F 2413/11* (2013.01); *G02F 2413/12* (2013.01)

(58) Field of Classification Search
None
See application file for complete search history.

(56) References Cited

U.S. PATENT DOCUMENTS

| | | | | |
|---|---|---|---|---|
| 2005/0190326 A1* | 9/2005 | Jeon | ............... | G02F 1/133634 349/117 |
| 2006/0221280 A1* | 10/2006 | Oka | ............... | G02F 1/133634 349/117 |
| 2008/0043329 A1* | 2/2008 | Jagt | ............... | G02F 1/133528 359/487.02 |
| 2008/0068537 A1* | 3/2008 | Lee | ............... | G02F 1/136209 349/106 |
| 2010/0220273 A1* | 9/2010 | Nakajima | ......... | G02F 1/133634 349/117 |

(Continued)

FOREIGN PATENT DOCUMENTS

| | | |
|---|---|---|
| JP | 2009151126 | 7/2009 |
| JP | 2014002419 | 1/2014 |

(Continued)

*Primary Examiner* — Dennis Y Kim
(74) *Attorney, Agent, or Firm* — Cantor Colburn LLP

(57) ABSTRACT

Disclosed is a liquid crystal display, including: a first substrate and a second substrate, which face each other; a color filter disposed on the first substrate; a liquid crystal layer interposed between the first substrate and the second substrate; a first polarizing plate disposed outside the first substrate; a first compensation film disposed outside the first polarizing plate; a second compensation film disposed outside the second substrate; and a second polarizing plate disposed outside the second compensation film, in which the second compensation film includes a biaxial film, and the first substrate and the second substrate include a poly-amide (PA) having an optical characteristic of a negative C-plate.

17 Claims, 6 Drawing Sheets

(56) References Cited

U.S. PATENT DOCUMENTS

2013/0343032 A1* 12/2013 Lee .................. G02B 5/3083
362/19
2016/0274399 A1* 9/2016 Yang .................. G02F 1/13363

FOREIGN PATENT DOCUMENTS

| KR | 100744169 | 7/2007 |
| KR | 1020120018502 | 3/2012 |
| KR | 1020120123840 | 11/2012 |
| KR | 1020130110915 | 10/2013 |
| KR | 1020150010042 | 1/2015 |

* cited by examiner

LIQUID CRYSTAL DISPLAY

This application claims priority to Korean Patent Application No. 10-2015-0049658 filed on Apr. 8, 2015, and all the benefits accruing therefrom under 35 U.S.C. § 119, the content of which in its entirety is herein incorporated by reference.

BACKGROUND (a) Field

Embodiments of the invention relate to a liquid crystal display, and more particularly, to a liquid crystal display with improved contrast ratio.

(b) Description of the Related Art

A liquid crystal display typically includes a liquid crystal panel for displaying an image using light, and a backlight assembly disposed under the liquid crystal panel and for providing the light to the liquid crystal panel.

The liquid crystal panel includes a first substrate including a thin film transistor and a pixel electrode, a second substrate facing the first substrate and including a common electrode, and a liquid crystal layer interposed between the first substrate and the second substrate.

Liquid crystals of the liquid crystal layer may be operated in a vertical alignment ("VA") mode by an electric field formed between a pixel electrode and a common electrode. In the VA mode, when an electric field is not generated between the pixel electrode and the common electrode, the liquid crystal panel implements a black image, and when an electric field is generated between the pixel electrode and the common electrode, the liquid crystal panel implements an image of various grayscales.

When an electric field is generated between the pixel electrode and the common electrode, the liquid crystals within the liquid crystal layer are arranged with an angle smaller than about 90° with respect to the pixel electrode or the common electrode panel to implement an image of which brightness is gradually increased.

SUMMARY

In a liquid crystal display in a vertical alignment ("VA") mode, when an electric field is generated between the pixel electrode and the common electrode, the liquid crystals within the liquid crystal layer are arranged with an angle smaller than about 90° with respect to the pixel electrode or the common electrode panel to implement an image of which brightness is gradually increased. Accordingly, when light is incident onto a front surface of the liquid crystal panel while the liquid crystals are arranged in a vertical direction, an excellent black image having low luminance is displayed, but when light is incident to a lateral surface of the liquid crystal panel while the liquid crystals are arranged in a vertical direction, a black image having higher luminance than that of the image displayed when light is incident to the front surface of the liquid crystal panel may be displayed. In a liquid crystal display in the VA mode, when light proceeding to the lateral surface of the liquid crystal panel obliquely passes through the liquid crystal panel, the light proceeding to the lateral surface of the liquid crystal panel experiences more phase delays by the liquid crystals compared to the light proceeding to the front surface of the liquid crystal panel, and light is scattered when the light passes through the thin film transistor and a color filter, so that a planarization state is changed and light leakage may occur. Accordingly, luminance of a black image may become substantially high in the liquid crystal panel operated in the VA mode, and a contrast ratio may be decreased.

Exemplary embodiments of the invention relate to a liquid crystal display with improved contrast ratio in a vertical alignment mode.

An exemplary embodiment of the invention provides a liquid crystal display including: a first substrate; a second substrate disposed opposite to the first substrate; a color filter disposed on the first substrate; a liquid crystal layer interposed between the first substrate and the second substrate; a first polarizing plate disposed outside the first substrate; a first compensation film disposed outside the first polarizing plate; a second compensation film disposed outside the second substrate; and a second polarizing plate disposed outside the second compensation film, in which the second compensation film includes a biaxial film, and the first substrate and the second substrate include a poly-amide ("PA") having an optical characteristic of a negative C-plate.

In an exemplary embodiment, a phase delay value within a surface of the biaxial film may be in a range of about 65 nanometers (nm) to about 130 nm, and a thickness directional phase delay value of the biaxial film may be in a range of about 70 nm to about 150 nm.

In an exemplary embodiment, the phase delay value within the surface of the biaxial film may be about 90 nm.

In an exemplary embodiment, the thickness directional phase delay value of the biaxial film may be about 130 nm.

In an exemplary embodiment, thickness directional phase delay values of all of the biaxial film, the first substrate and the second substrate may be in a range of about 240 nm to about 300 nm.

In an exemplary embodiment, thickness directional phase delay values of all of the biaxial film, the first substrate and the second substrate may be about 280 nm.

In an exemplary embodiment, a thickness of each of the first substrate and the second substrate may be in a range of about 1 um to about 20 um.

In an exemplary embodiment, the liquid crystal display may further include a thin film transistor disposed on the first substrate; a pixel electrode connected to the thin film transistor; and a common electrode disposed on the second substrate, in which the liquid crystal layer may be aligned by a vertical electric field generated between the pixel electrode and the common electrode.

In an exemplary embodiment, the liquid crystal display may further include a light blocking member disposed on the first substrate.

In an exemplary embodiment, the liquid crystal display may further include a spacer disposed between the first substrate and the second substrate.

In an exemplary embodiment, the spacer and the light blocking member may include a same material as each other.

In an exemplary embodiment, the spacer and the light blocking member may be disposed on a same layer as each other.

In an exemplary embodiment, the first compensation film may include a phase delay layer, and a phase delay value within a surface of the phase delay layer may be about zero (0), and a thickness directional phase delay value of the phase delay layer may be substantially close to zero (0).

In an exemplary embodiment, the first compensation film and the second compensation film may include at least one selected from tri-acetyl-cellulose ("TAC"), cyclic olefin polymer ("COP"), and an acrylic polymer resin.

In an exemplary embodiment, the acrylic polymer resin may include polymethylmethacrylate ("PMMA").

In an exemplary embodiment, the liquid crystal display may further include an upper support layer disposed outside the second polarizing plate, where the upper support layer supports and protects the second polarizing plate.

In an exemplary embodiment, the upper support layer may include tri-acetyl-cellulose ("TAC").

According to exemplary embodiments of the invention, luminance of a black image is effectively minimized, and a contrast ratio of the liquid crystal display is substantially improved through an optimum optical design in the structure of the liquid crystal display in which the color filter and the light blocking member are disposed on the lower panel.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
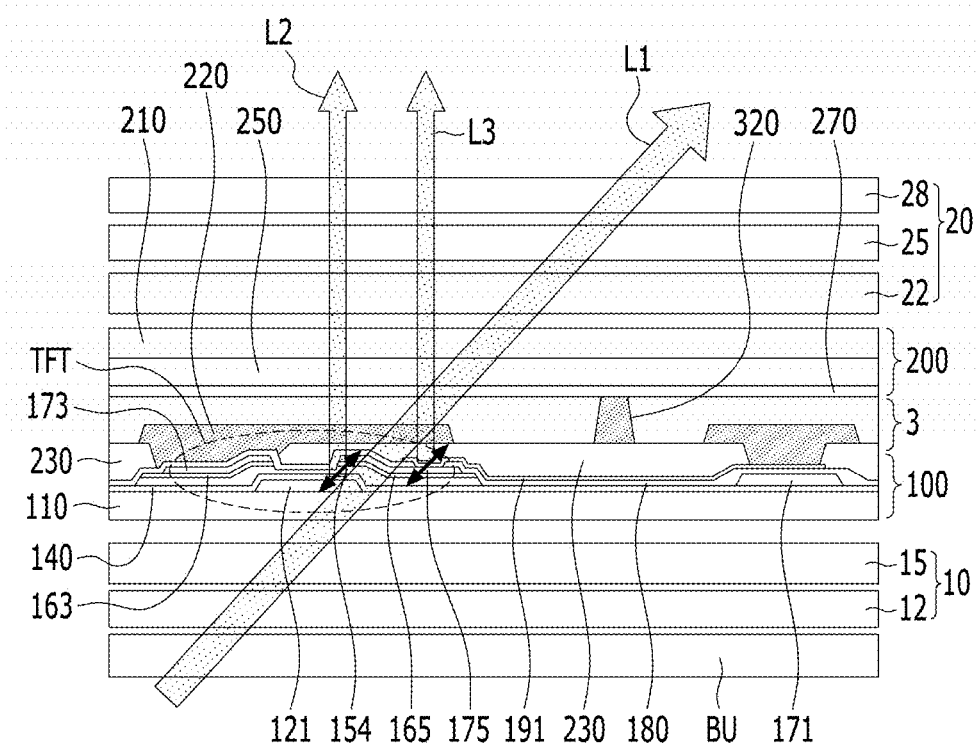
FIG. 1 is a cross-sectional view illustrating an exemplary embodiment of a liquid crystal display according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a liquid crystal display according to the invention will be described with reference to the accompanying drawings.

FIG. 1 is a cross-sectional view illustrating an exemplary embodiment of a liquid crystal display according to the invention.

Referring to FIG. 1, an exemplary embodiment of a liquid crystal display includes a lower panel 100; an upper panel 200 disposed opposite to the lower panel 100, a liquid crystal layer 3 interposed between the lower panel 100 and the upper panel 200, a first optical unit 10 disposed outside (e.g., disposed on an outer surface of) the lower display panel 100, and a second optical unit 20 disposed outside (e.g., disposed on an outer surface of) the upper panel 200.

The lower panel 100 includes a first substrate 110, a gate line 121 including a gate electrode disposed on the first substrate 110, a gate insulating layer 140 disposed on the gate line 121, a semiconductor layer 154 disposed on the gate insulating layer 140, ohmic contacts 163 and 165 disposed on the semiconductor layer 154, a data line 171 disposed on the ohmic contacts 163 and 165 and including a source electrode 173 and a drain electrode 175, a passivation layer 180 disposed on the source electrode 173 and the drain electrode 175 to cover the source electrode 173 and the drain electrode 175, a pixel electrode 191 disposed on the passivation layer 180, a color filter 230 disposed on the pixel electrode 191, and a light blocking member 220 disposed on the color filter 230. In an alternative exemplary embodiment, the color filter 230 may also be disposed under the pixel electrode 191.

The gate electrode, the source electrode 173 and the drain electrode 175 collectively defined a thin film transistor TFT, and the thin film transistor TFT is electrically connected with the pixel electrode 191. The pixel electrode 191 may include a transparent conductive material, and receives data voltages transmitted from the data line 171 through the thin film transistor TFT.

The light blocking member 220 is also referred to as a black matrix, and blocks light leakage around the pixel electrode 191. The light blocking member 220 may be disposed at portions corresponding to (e.g., to overlap) the gate line 121 and the data line 171, and a portion corresponding to the thin film transistor TFT. In an exemplary embodiment, the light blocking member 220 may be mainly disposed between adjacent color filters 230.

As described above, the color filters 230 and the light blocking members 220 are disposed on the lower panels 100 in an exemplary embodiment of the liquid crystal display according to the invention. However, the invention is not limited thereto. In an alternative exemplary embodiment, the color filter may be disposed on the lower panel 100, and the light blocking member 220 may be disposed on the upper panel 200.

The upper panel 200 includes an overcoat 250 disposed on the second substrate 210 and a common electrode 270 disposed on the overcoat 250. The common electrode 270 may include a transparent conductive material, and receives a common voltage. In an alternative exemplary embodiment, the overcoat 250 may be omitted. In an exemplary embodiment, the upper panel 200 may not have a patterned structure, such that a scattering factor may be removed and leakage of scattered light may be minimized in a front surface of the upper panel 200.

In an exemplary embodiment, the liquid crystal layer 3 may operate in a vertical alignment mode. In such an embodiment, liquid crystals of the liquid crystal layer 3 in a state where an electric field is not generated between the pixel electrode 191 and the common electrode 270 are arranged in a vertical direction to the surface of the first substrate 110. When an electric field is generated between the pixel electrode 191 and the common electrode 270, the liquid crystals of the liquid crystal layer 3 are inclined with respect to the surface of the first substrate 110, and when an intensity of the electric field is increased, an inclined angle is increased, so that the liquid crystals of the liquid crystal layer 3 are finally arranged in a horizontal direction with respect to the surface of the first substrate 110.

A spacer 320, which maintains a cell gap of the liquid crystal layer 3, is disposed between the lower panel 100 and the upper panel 200. The spacer 320 may include or be formed of substantially the same material as that of the light blocking member 220, and may be simultaneously provided or formed in the same process together with the light blocking member 220 during a manufacturing process of the liquid crystal display, but not being limited thereto. In such an embodiment, the light blocking member 220 and the spacer 320 may be disposed on a same layer as each other, e.g., on the color filter 230 as shown in FIG. 1. In an alternative exemplary embodiment, the spacer 320 and the light blocking member 220 may be formed of different materials or by different processes.

The first optical unit 10 includes a first polarizing plate 15 disposed outside (e.g., on an external surface of) the lower panel 100, and a first compensation film 12 disposed outside the first polarizing plate 15.

The second optical unit 20 includes a second compensation film 22 disposed outside the upper panel 200, a second polarizing plate 25 disposed outside the second compensation film, and an upper support layer 28 disposed outside the second polarizing plate 25.

The upper support layer 28 supports and protects the second polarizing plate 25, and maintains an extension state of the second polarizing plate 25. The upper support layer 28 may include or be formed of tri-acetyl-cellulose ("TAC"). A surface treatment (e.g., anti-glare treatment or anti-reflection treatment) may be performed on an external surface of the upper support layer 28.

In general, the compensation film has refractive indices nx, ny and nz in directions of an x-axis, a y-axis and a z-axis, and a phase delay value Ro (also referred to as an in-plane or in-phase retardation value) and a thickness directional phase delay value Rth (also referred to as thickness direction retardation value) within a surface of the compensation film are defined by the following Equations 1 and 2.

$$Ro=(nx-ny)\times d \qquad \text{Equation 1}$$

$$Rth=\{(nx+ny)/2-nz\}\times d \qquad \text{Equation 2}$$

In Equations 1 and 2, d denotes a thickness of the compensation film.

In an exemplary embodiment, the first compensation film 12 includes a phase delay layer, of which a phase delay value Ro within the surface is about zero (0) and a thickness directional phase delay value Rth is substantially close to zero (0), and the second compensation film 22 includes a biaxial film. In such an embodiment, the first substrate 110 of the lower panel 100 and the second substrate 210 of the upper panel 200 include a poly-amide ("PA") having an optical characteristic of a negative C-plate. The biaxial film has refractive indices satisfying the following inequation: nx≠ny≠nz, and the negative C-plate has refractive indices satisfying the following inequation: nx=ny>nz. Here, an exemplary embodiment, as described above, the first substrate 110 and the second substrate 210 may include PA, but not being limited thereto. In an alternative exemplary embodiment, the first substrate 110 and the second substrate 210 may include a film having the optical characteristic of the negative C-plate or other plastic base substrates.

As described above, in an exemplary embodiment, where the second compensation film 22 includes the biaxial film and the first substrate 110 and the second substrate 210 have the negative C-plate optical characteristic, a phase delay value Ro within the surface of the biaxial film may be in a range of about 65 nanometers (nm) to about 130 nm, and a thickness directional phase delay value Rth of the biaxial film may be in a range of about 70 nm to about 150 nm. In one exemplary embodiment, for example, a phase delay value Ro within the surface of the biaxial film may be about 90 nm, and a thickness directional phase delay value Rth of the biaxial film may be about 130 nm. In such an embodiment, thickness directional phase delay values Rth of all of the biaxial film, the first substrate 110 and the second substrate 210 may be in a range of about 240 nm to about 300 nm. In one exemplary embodiment, for example, the thickness directional phase delay values Rth of all of the second compensation film 22, the first substrate 110 and the second substrate 210 may be about 280 nm. In such an embodiment, a thickness of each of the first substrate 110 and the second substrate 210 may be in a range of about 1 um to about 20 um, and a thickness directional phase delay value Rth of each of the first substrate 110 and the second substrate 210 may be in a range of about 50 nm to about 100 nm.

The first compensation film 12 and the second compensation film 22 may include at least one selected from tri-acetyl-cellulose ("TAC"), cyclic olefin polymer ("COP") and an acrylic polymer resin. The acrylic polymer resin may include polymethylmethacrylate ("PMMA").

A light source or a backlight unit BU is disposed under the first polarizing plate 15. Light generated in the light source BU and sequentially passed through the first optical unit 10, the lower panel 100, the liquid crystal layer 3 and the upper panel 200 passes through the second optical unit 20 to display an image.

Hereinafter, a path of light passing through an exemplary embodiment of the liquid crystal display according to the invention will be described with reference to FIGS. 1 and 2.

Figure 2:
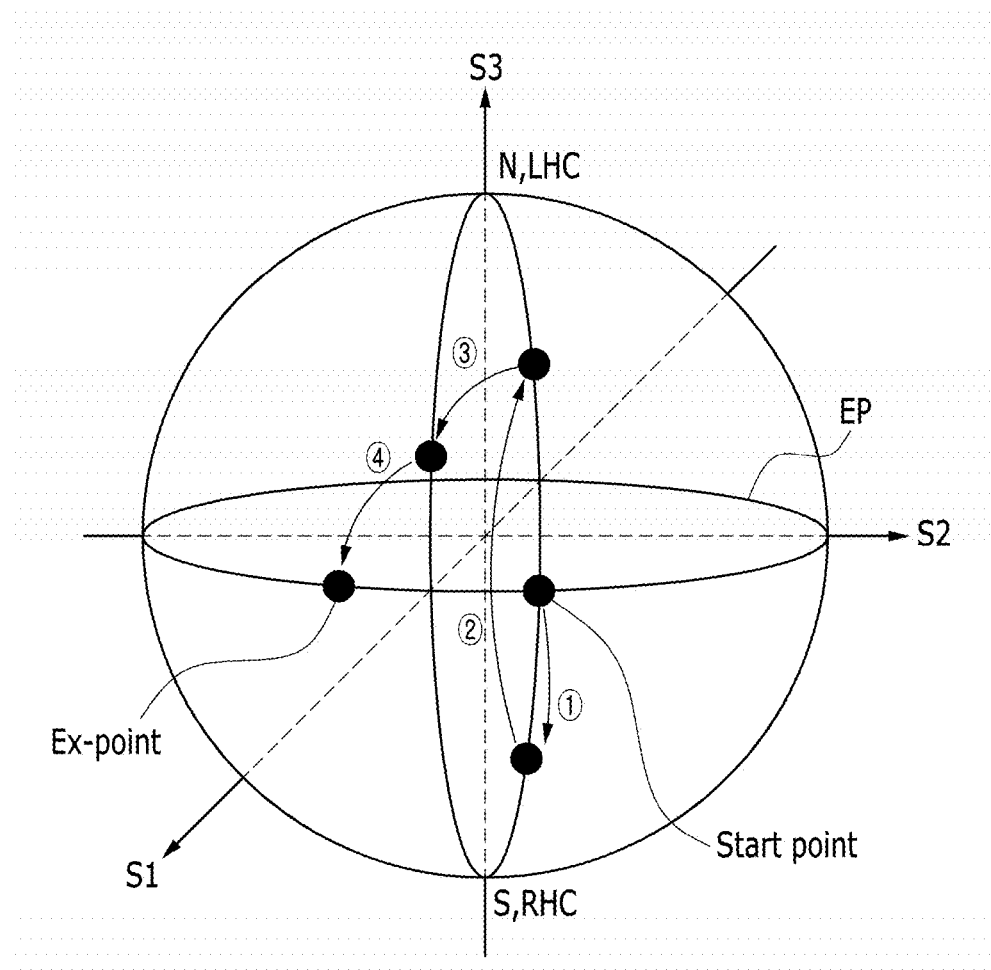
FIG. 2 is a diagram illustrating a Poincare sphere surface indicating a polarization state according to a path of light in the liquid crystal display of FIG. 1.

FIG. 2 is a diagram illustrating a Poincare sphere surface indicating a polarization state according to a path of light in the liquid crystal display of FIG. 1. Here, the Poincare sphere surface is a diagram based on a viewer viewing the liquid crystal display from a front thereof at an azimuth of about 45° and a poloidal angle of about 60°. The Poincare sphere surface represents a polarization state in coordinates of a three-dimensional space according to a strokes parameter. In FIG. 2, the northern hemisphere of the Poincare sphere surface has a left-handed circle ("LHC"), and the southern hemisphere of the Poincare sphere surface has a right-handed circle ("RHC").

Referring to FIGS. 1 and 2, light L1 generated by the light source BU disposed under the first optical unit 10 passes through the first optical unit 10. In such an embodiment, a phase difference of the first compensation film 12 is substantially close to zero (0), to allow a polarization state on the Poincare sphere surface to be substantially in a linear polarization state.

The light passing through the first optical unit 10 is incident into the lower panel 100. The light incident into the lower panel 100 passes through the first substrate 110 and the polarization state of the light on the Poincare sphere surface moves along the path ① as shown in FIG. 2, so that the light is disposed between a south pole S and an equatorial plane EP. The light passed through the first substrate 110 meets the thin film transistor TFT and the color filter 230 to generate scattered light L2 and L3. Here, the scattered light L2 by the thin film transistor TFT and the scattered light L3 by the color filter 230 causes less light leakage compared to the scattering generated in a circular polarization state. In such an embodiment, the light passed through the first optical unit 10 may meet the light blocking member 220 to generate scattered light, and the scattering form or pattern is similar to the scattering form or pattern generated by the thin film transistor TFT and the color filter 230.

The light passed through the lower panel 100 passes through the liquid crystal layer 3, and the polarization state of the light on the Poincare sphere surface thereby moves along the path ② as shown in FIG. 2, so that the light is disposed between a north pole N and the equatorial plane EP.

The light passing through the liquid crystal layer 3 is incident into the upper panel 200. The light incident into the upper panel 200 passes through the second substrate 210, and the polarization state of the light on the Poincare sphere surface thereby moves along the path ③ as shown in FIG. 2, such that the light slightly moves down in an opposite direction to the path ②.

The light passed through the upper panel 200 passes through the second compensation film 22 and the polarization state on the Poincare sphere surface moves along the path ④ as shown in FIG. 2, such that the light reaches an extinction point Ex-point disposed on the equatorial surface EP of the Poincare sphere surface.

In an exemplary embodiment of the liquid crystal display according to the invention, as described with reference to FIGS. 1 and 2, light leakage according to scattering of light generated by the thin film transistor TFT, the color filter 230, the light blocking member 220 and the like is substantially minimized by an optical design based on the structure in which the color filter 230 and the light blocking member 220 are disposed on the lower panel 100, the first compensation film 12 includes a phase delay layer, of which a phase delay value Ro within the surface is about zero (0) and the thickness directional phase delay value Rth is close to zero (0), and the second compensation film 22 includes the biaxial film, and the first substrate 110 of the lower panel 100 and the second substrate 210 of the upper panel 200 includes a PA having the optical characteristic of the negative C-plate.

If the first substrate 110 and the second substrate 210 are not formed of PA having the optical characteristic of the negative C-plate, but are formed of a general glass material, and the thickness directional phase delay value Rth of the second compensation film 22 formed of the biaxial film is further increased, a dispersion effect for each wavelength is large, such that all of the light passed through the color filters 230 representing different colors may not be effectively moved or converted to the extinction point Ex-point.

In an exemplary embodiment of the invention, a dispersion of a wavelength is substantially decreased by relatively decreasing a thickness directional phase delay value Rth of the second compensation film 22 including the biaxial film, and forming the first substrate 110 and the second substrate 220 with PA having the optical characteristic of the negative C-plate having the inverse dispersion effect. Accordingly, in such an embodiment, a contrast ratio of the lateral surface of the display is substantially improved.

Hereinafter, a contrast ratio of an exemplary embodiment of the liquid crystal display according to the invention and a contrast ratio of a comparative embodiment of a liquid crystal display will be described in detail with reference to FIGS. 3 to 6.

Figure 3:
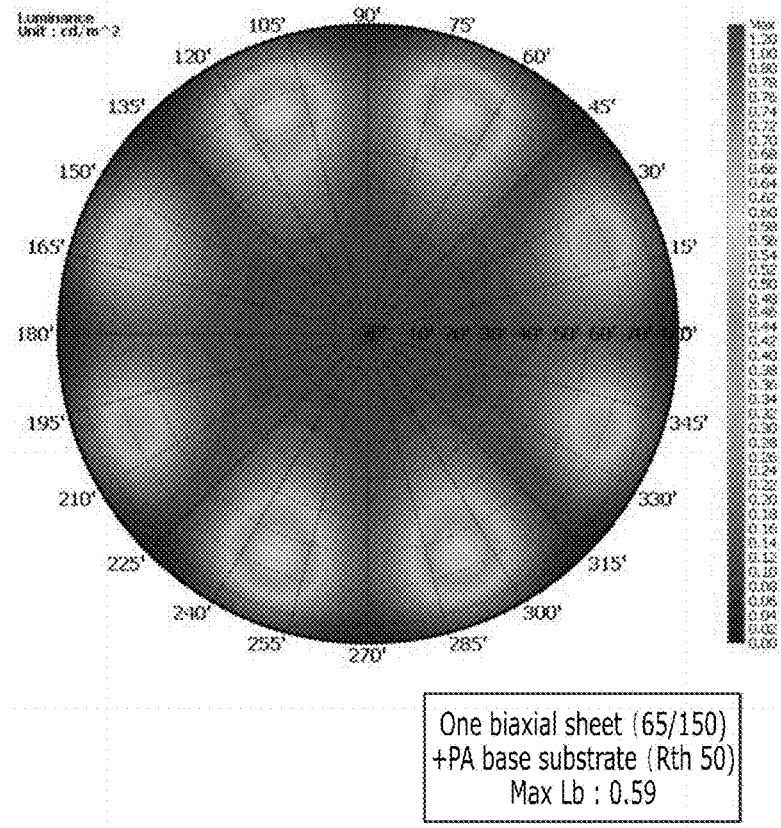
FIGS. 3 to 5 are simulation results representing luminance in a black state of an exemplary embodiment of the liquid crystal display according to the invention.
Figure 4:
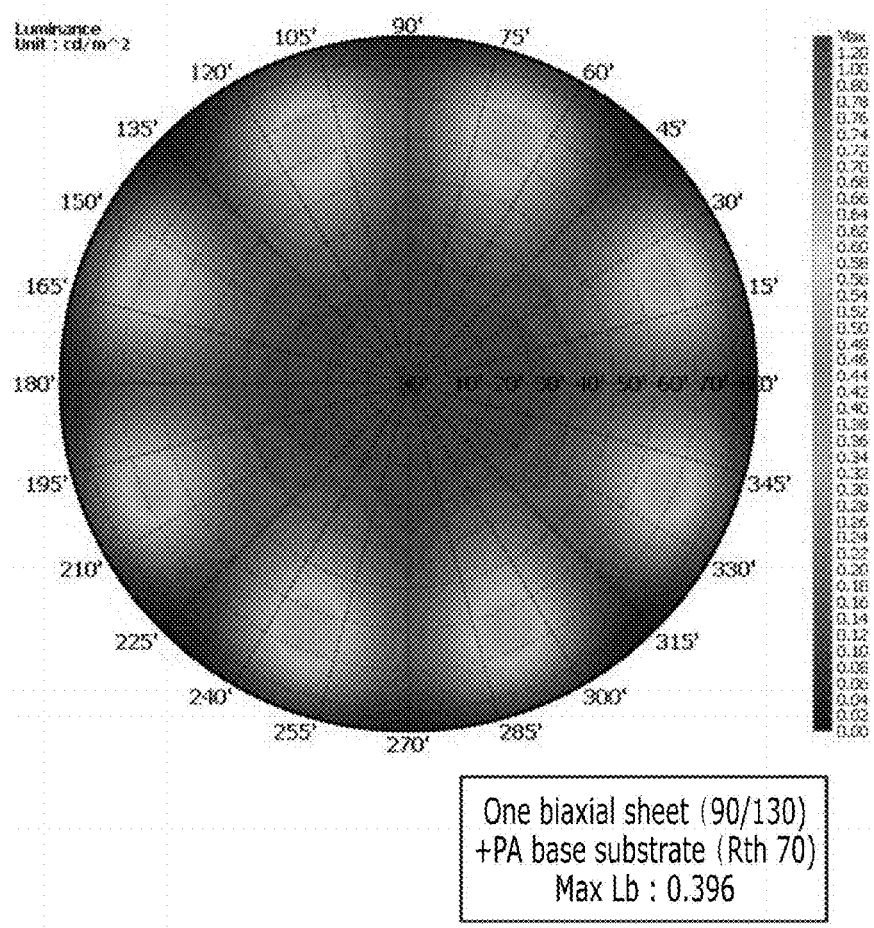
Figure 5:
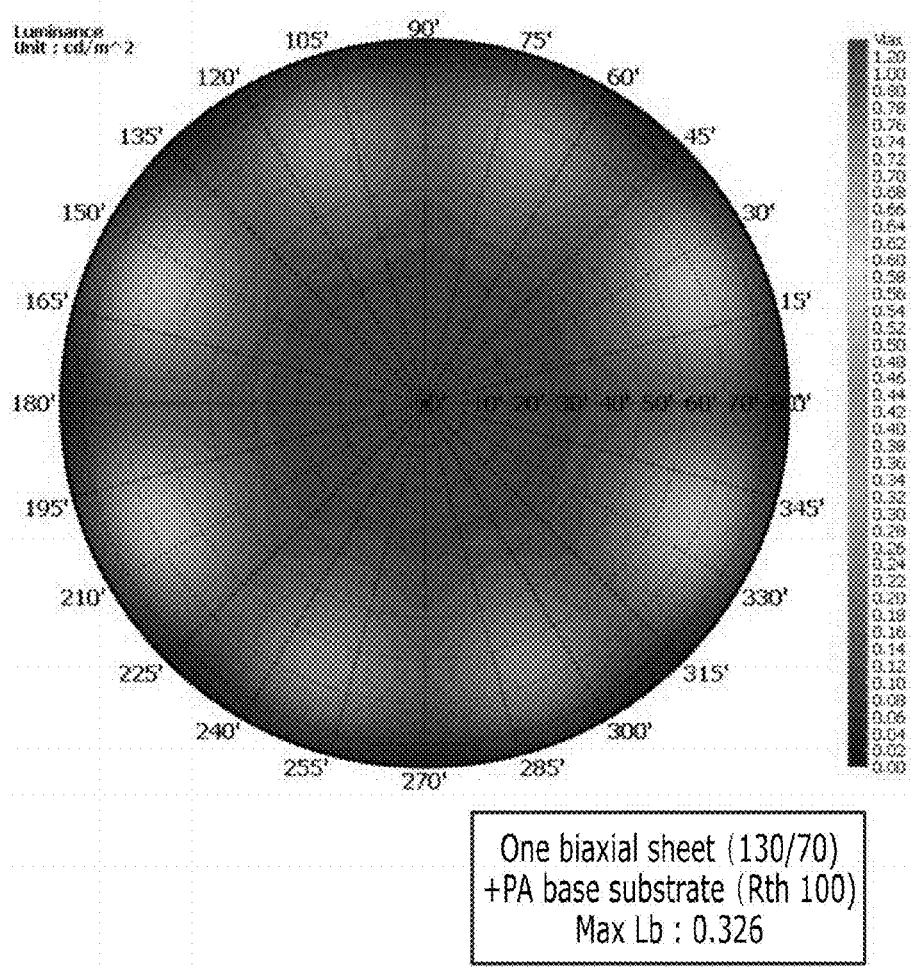
Figure 6:
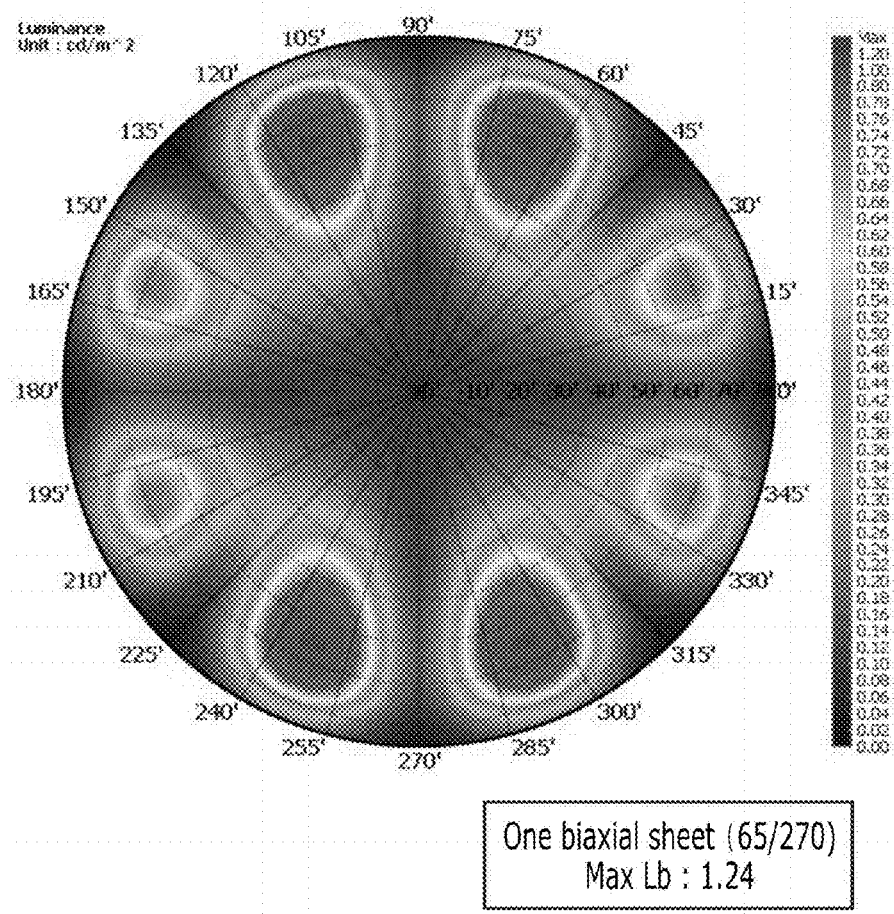
FIG. 6 is a simulation result representing luminance in a black state of a comparative embodiment of a liquid crystal display.

FIGS. 3 to 5 are simulation results representing luminance in a black state of an exemplary embodiment of the liquid crystal display according to the invention, and FIG. 6 is a simulation result representing luminance in a black state of a comparative embodiment of a liquid crystal display.

FIG. 3 illustrates luminance of one exemplary embodiment of the liquid crystal display according to the invention in a black state, where the second compensation film 22 is formed of a biaxial film, of which a phase delay value Ro within the surface is about 65 nm and a thickness directional phase delay value Rth is about 150 nm, and each of the first substrate 110 and the second substrate 210 is formed of PA having the optical characteristic of the negative C-plate, of which a thickness directional phase delay value Rth is about 50 nm. Here, maximum luminance Max Lb at a point, at which luminance is highest, is about 0.59 candela per square meter ($cd/m^2$).

FIG. 4 illustrates luminance of one exemplary embodiment of the liquid crystal display according to the invention in a black state, where the second compensation film 22 is formed of a biaxial film, of which a phase delay value Ro within the surface is about 90 nm and a thickness directional phase delay value Rth is about 130 nm, and each of the first substrate 110 and the second substrate 210 is formed of PA having the optical characteristic of the negative C-plate, of which a thickness directional phase delay value Rth is about 70 nm. Here, maximum luminance Max Lb at a point, at which luminance is highest, is about 0.396 $cd/m^2$.

FIG. 5 illustrates luminance of one exemplary embodiment of the liquid crystal display according to the invention in a black state, where the second compensation film 22 is formed of a biaxial film, of which a phase delay value Ro within the surface is about 130 nm and a thickness directional phase delay value Rth is about 70 nm, and each of the first substrate 110 and the second substrate 210 is formed of PA having the optical characteristic of the negative C-plate, of which a thickness directional phase delay value Rth is about 100 nm. Here, maximum luminance Max Lb at a point, at which luminance is highest, is about 0.326 $cd/m^2$.

FIG. 6 illustrates luminance of a comparative embodiment of a liquid crystal display in a black state, where the first substrate 110 and the second substrate 210 are formed of a general glass material, and the second compensation film 22 is formed of a biaxial film, of which a phase delay value Ro within the surface is about 65 nm and a thickness directional phase delay value Rth is about 270 nm. Here, maximum luminance Max Lb at a point, at which luminance is highest, is about 1.24 $cd/m^2$.

As shown in FIG. 6, when a phase difference of the second compensation film 22 is large, and the first substrate 110 and the second substrate 210 do not have the optical characteristic of the negative C-plate, a point, at which luminance is highest in the black state, exhibits luminance of about 1.24 $cd/m^2$. In contrast, as shown in FIGS. 3 to 5, in an exemplary embodiment of the liquid crystal display according to the invention, a point, at which luminance is highest in the black state, exhibits luminance in a range of about 0.326 $cd/m^2$ to about 0.59 $cd/m^2$.

As described above, an exemplary embodiment of the liquid crystal display according to the invention exhibits very low luminance in a black state such that light leakage is effectively prevented. Accordingly, in an exemplary embodiment of the liquid crystal display according to the invention, a contrast ratio is substantially improved by minimizing luminance of a black image.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display, comprising:
a display panel comprising:
a first substrate;
a second substrate disposed opposite to the first substrate;
a color filter disposed on the first substrate; and
a liquid crystal layer interposed between the first substrate and the second substrate;
a first optical unit comprising:
a first polarizing plate disposed outside the first substrate; and
a first compensation film disposed outside the first polarizing plate; and
a second optical unit comprising:
a second compensation film disposed outside the second substrate; and
a second polarizing plate disposed outside the second compensation film,
wherein the second compensation film comprises a biaxial film, and
the first substrate and the second substrate comprise a poly-amide having an optical characteristic of a negative C-plate.

2. The liquid crystal display of claim 1, wherein
a phase delay value within a surface of the biaxial film is in a range of about 65 nm to about 130 nm, and
a thickness directional phase delay value of the biaxial film is in a range of about 70 nm to about 150 nm.

3. The liquid crystal display of claim 2, wherein
the phase delay value within the surface of the biaxial film is about 90 nm.

4. The liquid crystal display of claim 2, wherein
the thickness directional phase delay value of the biaxial film is about 130 nm.

5. The liquid crystal display of claim 2, wherein
thickness directional phase delay values of all of the biaxial film, the first substrate and the second substrate are in a range of about 240 nm to about 300 nm.

6. The liquid crystal display of claim 5, wherein
thickness directional phase delay values of all of the biaxial film, the first substrate and the second substrate are about 280 nm.

7. The liquid crystal display of claim 5, wherein
a thickness of each of the first substrate and the second substrate is in a range of about 1 um to about 20 um.

8. The liquid crystal display of claim 5, further comprising:
a thin film transistor disposed on the first substrate;
a pixel electrode connected to the thin film transistor; and
a common electrode disposed on the second substrate,
wherein the liquid crystal layer is aligned by a vertical electric field generated between the pixel electrode and the common electrode.

9. The liquid crystal display of claim 8, further comprising:
a light blocking member disposed on the first substrate.

10. The liquid crystal display of claim 9, further comprising:
a spacer disposed between the first substrate and the second substrate.

11. The liquid crystal display of claim 10, wherein
the spacer and the light blocking member comprise a same material as each other.

12. The liquid crystal display of claim 11, wherein
the spacer and the light blocking member are disposed on a same layer as each other.

13. The liquid crystal display of claim 5, wherein
a phase delay value within a surface of the first compensation film is about zero (0), and
a thickness directional phase delay value of first compensation film is substantially close to zero (0).

14. The liquid crystal display of claim 1, wherein
the first compensation film and the second compensation film comprise at least one selected from tri-acetyl-cellulose, cyclic olefin polymer, and an acrylic polymer resin.

15. The liquid crystal display of claim 14, wherein
the acrylic polymer resin comprises polymethylmethacrylate.

16. The liquid crystal display of claim 1, further comprising
an upper support layer disposed outside the second polarizing plate,
wherein to the upper support layer supports and protects the second polarizing plate.

17. The liquid crystal display of claim 16, wherein
the upper support layer comprises tri-acetyl-cellulose.

* * * * *